United States Patent Office 2,885,263
Patented May 5, 1959

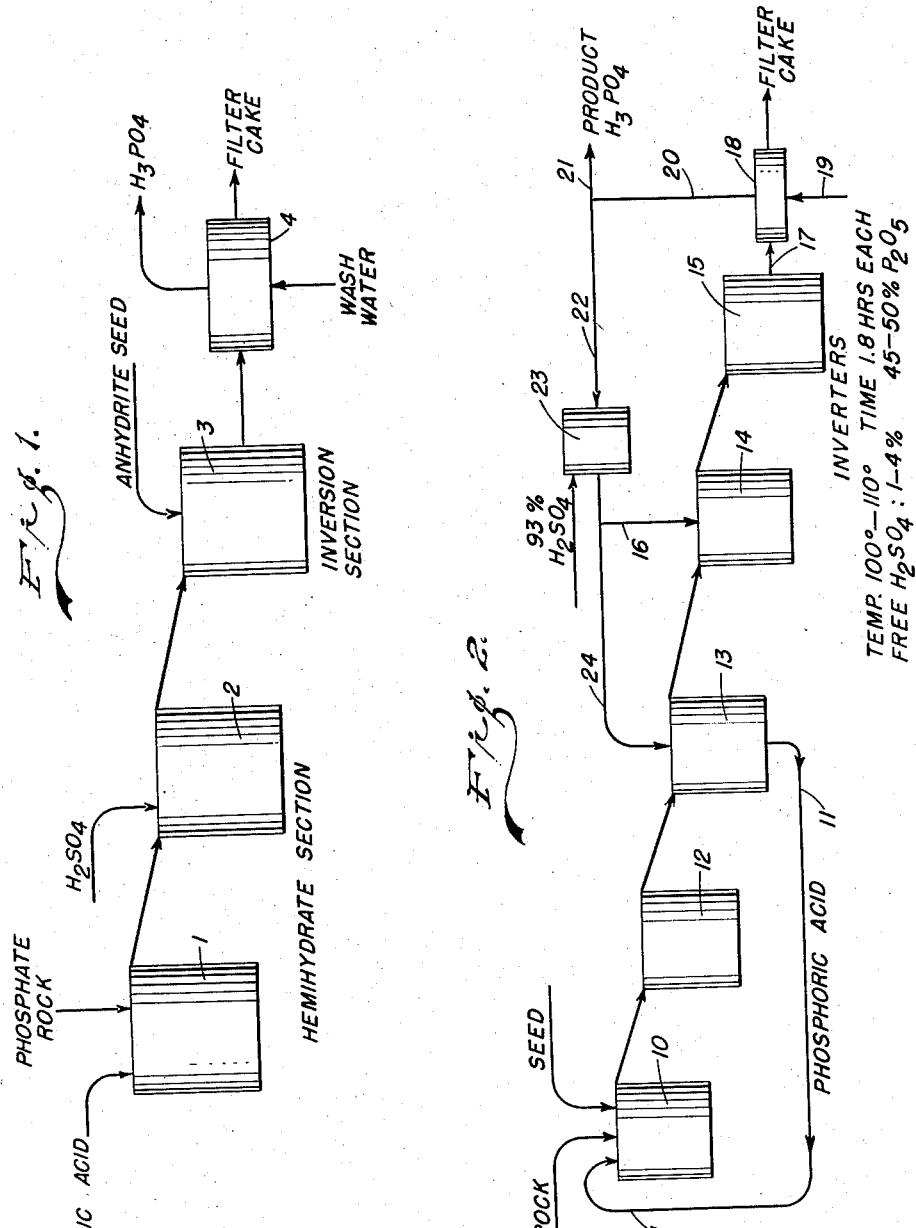

2,885,263
ANHYDRITE PROCESS FOR PHOSPHORIC ACID MANUFACTURE

Robert B. Peet, Danbury, Conn., assignor to Chemical Construction Corporation, New York, N.Y., a corporation of Delaware Application June 10, 1955, Serial No. 514,508

2 Claims. (Cl. 23—165)

This invention relates to the manufacture of phosphoric acid by the digestion of phosphate rock and is directed particularly to methods for improving the filterability of the crystalline calcium sulfate precipitates obtained in this process.

In one method that is now used for the production of phosphoric acid ground phosphate rock is digested with strong aqueous phosphoric acid to form a solution of monocalcium phosphate which is treated with sulfuric acid to liberate free phosphoric acid and form hydrated calcium sulfate crystals. In order to obtain a rapid and complete liberation of the phosphate values from the rock the digestion is carried out at elevated temperatures on the order of 80° C. and higher with strong phosphoric acid containing at least 40% $P_2O_5$, but these operating conditions result in the formation of calcium sulfate hemihydrate crystals which tend to blind or clog the cloth of a vacuum filter and require extensive washing. It is a principal object of the present invention to provide methods whereby the suspensions of calcium sulfate hemihydrate crystals in strong phosphoric acid obtained by adding sulfuric acid to such monocalcium phosphate solutions are converted into suspensions of calcium anhydrite which are easily filterable and washable.

The present invention is based on the concept of subjecting a slurry of calcium sulfate hemihydrate crystals in aqueous phosphoric acid, such as are produced in the above-described process, to an inversion treatment which will convert them into relatively large and easily filterable crystals of calcium sulfate anhydrite. By carrying out this inversion process in the phosphoric acid-calcium sulfate slurry prior to its filtration for the removal of the phosphoric acid, the subsequent filtration and washing steps are greatly facilitated. When the inversion of calcium sulfate hemihydrate to calcium sulfate anhydrite is carried out by the procedure hereinafter described a rapid and substantially complete separation of the phosphoric acid product from the calcium sulfate is obtained with a minimum use of wash water; in fact, the quantity of wash water needed is frequently not substantially greater than the moisture carried away by the filter cake so that there is little or no dilution of the product acid.

The invention will be described in detail with reference to the accompanying drawings wherein Fig. 1 is a diagrammatic representation of the principles of the process and Fig. 2 is a similar diagrammatic representation of a preferred embodiment thereof. Referring to Fig. 1, it will be seen that the process is made up generally of a phosphoric acid digestion and sulfuric acid treatment indicated as a hemihydrate section, a further treatment of the resulting slurry which is designated as an inversion section, and a final filtering and washing operation. In the hemihydrate section a mixture of ground phosphate rock and aqueous phosphoric acid is brought together in a suitably agitated reaction vessel 1 to form a monocalcium phosphate solution which is introduced into a calcium sulfate precipitator 2. In this precipitator the solution is treated with sulfuric acid under conditions such that phosphoric acid and calcium sulfate hemihydrate are formed by the reaction:

$$CaH_4(PO_4)_2 + H_2SO_4 + \tfrac{1}{2}H_2O \rightarrow 2H_3PO_4 + CaSO_4 \cdot \tfrac{1}{2}H_2O$$

The slurry of finely divided calcium sulfate hemihydrate crystals produced by this reaction is difficult to filter and wash efficiently. Therefore, in accordance with a principal feature of the invention, this slurry is treated to modify the crystal form of the calcium sulfate from the hemihydrate to the anhydrite. For purposes of illustration the process this is shown as being effected in a single reaction vessel or inverter 3, but it will become evident from the following description that the inversion can be carried out over a series of reaction vessels if desired.

After inverting the calcium sulfate hemihydrate to the anhydrite crystal form to obtain an easily filterable and washable slurry, the crystal suspension is passed to a filtering and washing procedure which is indicated generally by reference numeral 4. Because of the relatively small quantity of sulfuric acid required by the inversion step, and because of the small amount of wash water required on the filter, the phosphoric acid obtained from this filter has both a high strength and a relatively high degree of purity. A portion of the filtrate may therefore be withdrawn directly as product acid, the remainder being returned to the process for use in digesting further quantities of phosphate rock.

Successful operation of the above-described procedure is directly dependent on the provision of an inversion method that can be carried out at low sulfuric acid concentrations, since the use of strong sulfuric acid to dehydrate the calcium sulfate hemihydrate would result in heavy losses of this acid in the filter cake or wash water and in a high degree of contamination of the product phosphoric acid. I have discovered, however, that the finely divided calcium sulfate hemihydrate crystals can be converted into coarse and easily filterable crystals of anhydrite at sulfuric acid concentrations as low as from 1 to 4% when suitable operating conditions are maintained. These conditions are, first, the maintenance of temperatures of about 100° to about 110° C. or higher; second, treatment of the hemihydrate crystals as a slurry in relatively strong phosphoric acid having a $P_2O_5$ content of 40–50% or higher; and finally, the presence of anhydrite seed crystals in the slurry. When these conditions are maintained, conversion of the calcium sulfate hemihydrate to anhydrite in quantities sufficient to obtain good filtration and washing on the filter 4 is obtainable in about 1 to 4 hours or less.

The degree of inversion necessary for good filtration and washing will of course depend to a considerable extent on the size of the anhydrite crystals. This, in turn, depends on the type of seed crystals used. For this reason I greatly prefer to prepare the anhydrite seed crystals separately from the process and to add them as needed. It is an important advantage of the invention that only very small quantities of anhydrite seed crystals are required, usually on the order of about 0.01% to 2% on the weight of the phosphate rock which is ordinarily about 0.01% to 1.5% on the weight of the calcium sulfate hemihydrate with most of the phosphate rock of commerce. Seed crystals suitable for use in the process are flat plates which may vary in size, say from about 13 x 6 microns to 40 x 13 microns, and are added in sufficient quantity to produce crystals of desired size. A suitable method for their production is as follows: Two liters of 96% sulfuric acid are diluted with 4.67 liters of water. A solution of 667 grams of calcium chloride in 1667 grams of water is prepared, and both solutions are heated to 100° C. The calcium chloride solution is then added to the 42% sulfuric acid, whereupon a curdy white precipitate of hemihydrate is formed which inverts spontaneously to anhydrite at 100° C. The resulting seed crystals are filtered and washed with water and may be dried and mixed with the ground phosphate rock or may be added as a slurry at any other desired point in the process. Seed crystals may also be made by diverting say about 10% of the hemihydrate from the calcium sulfate precipitator 2 to a nucleation tank where a stream of moderately concentrated sulfuric acid is added in amounts predetermined to yield the desired quantity of anhydrite nuclei.

When these seed crystals are employed, and when the operating conditions outlined above are maintained in the inversion section, inversions of 70% to 100% of the calcium sulfate hemihydrate to anhydrite crystals are obtained in times of about 1–4 hours. The slurries resulting from these inversions are easily filterable and $P_2O_5$ recoveries of up to 90% are obtainable with wash water ratios of about 0.3–0.6 pound of water for each pound of dry filter cake. Since up to 0.4 pound of water is removed with each pound of filter cake, it will be seen that there is little or no dilution of the product phosphoric acid by the wash water. Larger quantities of seed crystals or longer inversion times can of course be used with a corresponding increase in the percent conversion of hemihydrate to anhydrite but are not ordinarily worthwhile.

Fig. 2 of the drawings illustrates an embodiment of the invention wherein the principles discussed above are applied. Ground phosphate rock is introduced into a digestion tank 10 along with suitable quantities of anhydrite seed, the latter being preferably added at a ratio of about 0.1% to 1% on the weight of the phosphate rock. Phosphoric acid, preferably having a strength corresponding to a $P_2O_5$ content of about 40–55%, is introduced through line 11 and suitable agitation is provided for the digestion reaction. The slurry from the tank 10 overflows into a second digestion tank 12, which is also provided with an agitator, wherein the formation of monocalcium phosphate solution is completed. Temperatures of about 80°–100° C. are preferably maintained in the digesters 10 and 12.

The monocalcium phosphate solution from tank 12 overflows into tank 13 wherein it is treated with sulfuric acid and a portion of the resulting slurry is recycled through line 11 to the digestion tank 10, the remainder overflowing into tank 14. It has been found, as an important feature of the invention, that the process is materially improved by splitting the supply of sulfuric acid into two streams, a major proportion being fed to the tank 13 and a minor proportion to the tank 14. Advantageously the sulfuric acid is supplied in admixture with recycled phosphoric acid, although it will be evident that these acids may be supplied in separate streams if desired.

The quantity of sulfuric acid introduced into the tank 13 should not be more than the stoichiometric equivalent of the calcium content of the monocalcium phosphate, and should preferably be from about 1% to 5% less than the amount necessary to precipitate all of the calcium. The remainder of the sulfuric acid necessary for calcium precipitation is supplied to the tank 14, wherein a sulfuric acid concentration of about 1% to 4% is maintained. Two important purposes are accomplished by this procedure; first, there is no sulfuric acid in the phosphoric acid solution leaving tank 13 through line 11, and secondly, most of the sulfuric acid used to assist the inversion of calcium sulfate hemihydrate to anhydrite in tank 14 is eventually precipitated by unreacted or excess monocalcium phosphate in the tanks 14 and 15 and therefore does not contaminate the phosphoric acid product.

It will be understood that the material flowing through line 11 is a portion of the slurry in tank 13 and therefore contains calcium sulfate hemihydrate crystals in suspension; however, these crystals pass through the tanks 10 and 11 and are returned to tank 13 without change and therefore do not interfere with the digestion process. The presence of sulfuric acid in the recycled phosphoric acid, on the other hand, would cause the formation of layers of calcium sulfate hemihydrate around the particles of ground phosphate rock in the tank 10, which would interfere seriously with the digestion process and reduce the yields of monocalcium phosphate obtained.

The slurry of calcium sulfate hemihydrate in aqueous phosphoric acid of 40–50% $P_2O_5$ content, or stronger, overflows from the tank 13 into tank 14 and thence into tank 15, the latter two tanks constituting the inversion section. The first or both of these tanks are preferably provided with heating coils or other means for raising the temperature of the slurry to inversion temperatures of at least 100° C., and preferably 100°–110° C. or higher, and maintaining it at these temperatures. Sufficient additional sulfuric acid, which may be in admixture with phosphoric acid, is introduced through line 16 to attain a concentration of about 1–4% sulfuric acid in the tanks 14 and 15, the preferred quantities being within the range of about 1–2%. The anhydrite seed crystals, which were supplied to the tank 10 along with the ground phosphate rock, are of course carried along with the slurry into tanks 14 and 15, and in the presence of these crystals the inversion of calcium sulfate hemihydrate to anhydrite is completed to the necessary extent in a few hours. The slurry is then pumped through line 17 to a filter 18, which may be a horizontal rotating filter of the type ordinarily used in phosphoric acid manufacture, where the phosphoric acid is separated from the calcium sulfate filter cake and washed with water entering through line 19. The phosphoric acid leaves the filter through line 20 and a minor proportion is withdrawn at 21 as product acid, the remainder being passed through line 22 to a mixing tank 23 where it is mixed with sulfuric acid and returned to the process through lines 16 and 24.

In a typical embodiment of this process, which was carried out on a pilot plant scale, 750 grams per minute of ground phosphate rock containing about 76% of tricalcium phosphate and 7.5 grams per minute of anhydrite seed were fed to the digester 10 which was operated at a temperature of 80° C. The recycle rate of phosphoric acid in the line 11 was 1300 cc. per minute and the retention time in the calcium sulfate precipitator, based on recycle, was 30 minutes. The quantity of sulfuric acid fed to tank 13 was 3.7% less than that necessary to precipitate all the calcium, the $P_2O_5$ content of the acid solution was 53% and the temperature was 110° C. The total retention time in the vessels 10 and 12 was about 0.5 hour, and complete digestion and conversion of the phosphate rock to monocalcium phosphate solution was obtained. In the inverter tanks 14 and 15 the temperature was 110° C., the acid strength was approximately 47% $P_2O_5$ and 2% $H_2SO_4$, and an 80–90% inversion of calcium sulfate hemihydrate to anhydrite was obtained. The retention time in tank 14 was 2 hours and retention time in tank 15 was 1 hour. The filtration rate on the filter 18 was about 100–110 lbs. per hour per square foot of filter area and overall $P_2O_5$ recoveries of 73% to 90% were obtained with a wash water ratio of 0.3. With wash water ratios of about 0.4–0.6 the overall $P_2O_5$ recovery was increased to 91%. The composition of the acid mixture in lines 16 and 24 was 34% $P_2O_5$ and 0.13% $H_2SO_4$, the quantities supplied being 250 cc. of the mixed acids per minute through line 24 and 100 cc. per minute through line 16.

In another run, carried out in the same equipment, the anhydrite seed was added continuously to tank 14 instead of being mixed with the ground phosphate rock.

The ground rock was fed into digester 10 at the rate of 100 grams per minute and digested with recycled phosphoric acid slurry supplied through line 11 at the rate of 2 liters per minute and having a phosphoric acid concentration of about 50–54% $P_2O_5$. The retention time in tanks 10 and 12 was 8 minutes each, based on the recycle rate. The acid mixture supplied through lines 16 and 24 contained 31% $P_2O_5$ and 19% $H_2SO_4$; the rate of flow in line 16 was 250 cc. per minute and in line 24 the flow rate was 60 cc. per minute. The quantity of seed crystals entering tank 14 was 5 grams per minute. Digestion tanks 10 and 12 were maintained at 90° C.; tank 13 was at 100° C., and tanks 14 and 15 were maintained at 110° C. At the flow rates indicated the quantity of sulfuric acid supplied to tank 13 was from 3% to 4% less than that required to precipitate all of the calcium and the concentration of free sulfuric acid in tank 14 was about 2%. The concentration of phosphoric acid in tanks 14 and 15 was about 53% $P_2O_5$, and under these conditions about 85% to 90% of the calcium sulfate hemihydrate was inverted to anhydrite crystals having a size between 9 x 15 microns to 35 x 80 microns. Filtration rates on the filter 18 were from about 95 to 120 lbs. per square foot of filter area and recoveries of up to 81% of phosphoric acid were obtained with wash water ratios of from 0.40 to 0.44 pound of water per pound of dry filter cake. With a wash water ratio of 0.44 the filtration rate was 109 pounds per hour of dry filter cake per square foot of filter area, the cake contained 26.7% of water, and the wet filter cake contained 4.09% of $P_2O_5$ of which 1.13% was citrate soluble and 2.96% was water soluble, the total $P_2O_5$ recovery in this case being 81%.

From the foregoing it will be seen that the present invention improves materially the filtration of slurries of calcium sulfate in strong phosphoric acid solutions by pretreating these slurries to effect an inversion of finely divided calcium sulfate hemihydrate crystals therein to the coaster and more easily filterable anhydrite crystal form. This is accomplished by heating the hemihydrate crystal slurries with anhydrite seed crystals at temperatures of at least 100° C., and preferably about 100–110° C. or higher, in the presence of the strong phosphoric acid of at least 40% $P_2O_5$ content in which they were formed and in the presence of small amounts of sulfuric acid represented by a sulfuric acid concentration of about 1–4%.

What I claim is:

1. A method for the production of strong phosphoric acid of at least 40% $P_2O_5$ content which comprises digesting phosphate rock in strong aqueous phosphoric acid, reacting the resulting monocalcium phosphate solution with sulfuric acid thereby forming a suspension of calcium sulfate hemihydrate crystals in aqueous phosphoric acid of at least 40% $P_2O_5$ content, said sulfuric acid being added in amounts which are about 1–4% in excess of that necessary to react with monocalcium phosphate in said suspension, adding seed crystals of calcium sulfate anhydrite to said suspension, heating this suspension at temperatures of at least 100° C. for about 1–4 hours to convert a major proportion of said calcium sulfate hemihydrate crystals into crystals of calcium sulfate anhydrite, and filtering the slurry so obtained to produce a filter cake of calcium sulfate anhydrite crystals and a filtrate of strong phosphoric acid of at least 40% $P_2O_5$ concentration.

2. A method for the production of strong phosphoric acid of at least 40% $P_2O_5$ content which comprises reacting phosphate rock with strong aqueous phosphoric acid in a digestion step and introducing the monocalcium phosphate solution resulting from said digestion into a precipitating step along with additional phosphoric acid, adding sulfuric acid to the solution in said precipitating step in amounts corresponding to about 1% to 5% less than the stoichiometric equivalent of the monocalcium phosphate introduced to form a suspension of calcium sulfate hemihydrate crystals in phosphoric acid free of sulfuric acid, returning a portion of said suspension to the digestion step and passing the remainder to an inversion step, adding seed crystals of calcium sulfate anhydrite to said suspension, adding sufficient sulfuric acid to the suspension in said inversion step to establish therein a sulfuric acid concentration of 1–4% in excess of the stoichiometric equivalent of monocalcium phosphate, heating said suspension at a temperature of at least 100° C. for about 1–4 hours to invert a major proportion of the calcium sulfate hemihydrate crystals therein into calcium sulfate anhydrite, and filtering the suspension so obtained to produce a filter cake of calcium sulfate anhydrite crystals and a filtrate of strong phosphoric acid of at least 40% $P_2O_5$ content.

References Cited in the file of this patent
UNITED STATES PATENTS

| | | |
|---|---|---|
| 1,776,595 | Nordengren | Sept. 23, 1930 |
| 1,836,672 | Larsson | Dec. 15, 1931 |
| 2,049,032 | Weber et al. | July 28, 1936 |
| 2,531,977 | Hammaren et al. | Nov. 28, 1950 |
| 2,710,247 | Knowles et al. | June 7, 1955 |